(12) United States Patent
Wilson

(10) Patent No.: US 11,490,673 B1
(45) Date of Patent: Nov. 8, 2022

(54) HEADWEAR WITH INTEGRATED IMAGE PROJECTOR

(71) Applicant: Otis Wilson, Ajax (CA)

(72) Inventor: Otis Wilson, Ajax (CA)

( * ) Notice: Subject to any disclaimer, the term of this patent is extended or adjusted under 35 U.S.C. 154(b) by 444 days.

(21) Appl. No.: 16/680,541

(22) Filed: Nov. 12, 2019

Related U.S. Application Data

(60) Provisional application No. 62/760,094, filed on Nov. 13, 2018.

(51) Int. Cl.
  *A42B 1/00* (2021.01)
  *A42B 1/004* (2021.01)
  *H04N 9/31* (2006.01)
  *G03B 29/00* (2021.01)
  *G06F 3/01* (2006.01)
  *H04M 1/72409* (2021.01)

(52) U.S. Cl.
  CPC ............ *A42B 1/004* (2013.01); *G03B 29/00* (2013.01); *G06F 3/01* (2013.01); *H04M 1/72409* (2021.01); *H04N 9/3173* (2013.01); *H04N 9/3185* (2013.01)

(58) Field of Classification Search
  CPC ...... G03B 21/14; G03B 21/28; G03B 21/145; G03B 21/208; H04N 9/315; H04N 9/3152; H04N 9/3173; H04N 9/3179; H04N 9/3182; A42B 1/002; A42B 1/004; A42B 1/006; A42B 1/009; A42B 1/0181; A42B 1/02; A42B 1/04
  See application file for complete search history.

(56) References Cited

U.S. PATENT DOCUMENTS

| 2007/0064311 | A1* | 3/2007 | Park | G02B 27/0172 359/630 |
| 2008/0239252 | A1* | 10/2008 | Konno | G02B 17/0621 348/E9.026 |
| 2010/0296066 | A1* | 11/2010 | Ou Yang | F21V 14/065 362/249.02 |
| 2013/0335379 | A1* | 12/2013 | Sharma | G06F 3/0425 345/175 |
| 2014/0198262 | A1* | 7/2014 | Chuang | G03B 21/145 348/789 |
| 2016/0048369 | A1* | 2/2016 | Zenoff | H04N 9/3173 345/2.1 |
| 2016/0097969 | A1* | 4/2016 | Sum | G03B 31/00 353/65 |
| 2017/0127196 | A1* | 5/2017 | Blum | H04R 25/554 |
| 2018/0088455 | A1* | 3/2018 | Cippant | G03B 37/06 |

(Continued)

*Primary Examiner* — Sultan Chowdhury
(74) *Attorney, Agent, or Firm* — Kyle A. Fletcher, Esq.

(57) ABSTRACT

The headwear with integrated image projector comprises an image projector and a hat. The hat may be adapted to be worn upon a head of a wearer. The image projector may be coupled to the hat. The hat may project a projected image from the hat onto a viewing surface using the image projector. In some embodiments, the image projector may be coupled to a first position of the hat and the viewing surface may be a second position of the hat. As a non-limiting example, the first position may be the front of the hat bowl and the second position may be the top surface of the hat brim. In some embodiments, the hat having the image projector may comprise a wireless communication interface such that the image projector may communicate with an application program running on a wearer's smartphone.

16 Claims, 4 Drawing Sheets

(56) References Cited

U.S. PATENT DOCUMENTS

2018/0341114 A1* 11/2018 Staton ................ G02B 27/0176
2019/0110033 A1*  4/2019 Nakajima ............ H04N 9/3194
2019/0293249 A1*  9/2019 Hamilton .............. F21S 10/007

* cited by examiner

HEADWEAR WITH INTEGRATED IMAGE PROJECTOR

CROSS REFERENCES TO RELATED APPLICATIONS

This application claims the benefit of U.S. Provisional Application No. 62/760,094, which was filed by the applicant on Nov. 13, 2018.

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of headwear, more specifically, headwear with an integrated image projector.

SUMMARY OF INVENTION

The headwear with integrated image projector comprises an image projector and a hat. The hat may be adapted to be worn upon a head of a wearer. The image projector may be coupled to the hat. The hat may project a projected image from the hat onto a viewing surface using the image projector. In some embodiments, the image projector may be coupled to a first position of the hat and the viewing surface may be a second position of the hat. As a non-limiting example, the first position may be the front of the hat bowl and the second position may be the top surface of the hat brim. In some embodiments, the hat having the image projector may comprise a wireless communication interface such that the image projector may communicate with an application program running on a wearer's smartphone.

An object of the invention is to cover and protect a wearer's head using a hat.

Another object of the invention is to provide an image projector to project an image onto a viewing surface.

A further object of the invention is to provide a light toggle and an image toggle for controlling the image projector.

Yet another object of the invention is to provide a wireless transceiver such that the image projector may be monitored and controller from a wearer's smartphone.

These together with additional objects, features and advantages of the headwear with integrated image projector will be readily apparent to those of ordinary skill in the art upon reading the following detailed description of the presently preferred, but nonetheless illustrative, embodiments when taken in conjunction with the accompanying drawings.

In this respect, before explaining the current embodiments of the headwear with integrated image projector in detail, it is to be understood that the headwear with integrated image projector is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the headwear with integrated image projector.

It is therefore important that the claims be regarded as including such equivalent construction insofar as they do not depart from the spirit and scope of the headwear with integrated image projector. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description. As used herein, the word "or" is intended to be inclusive.

Figure 1:
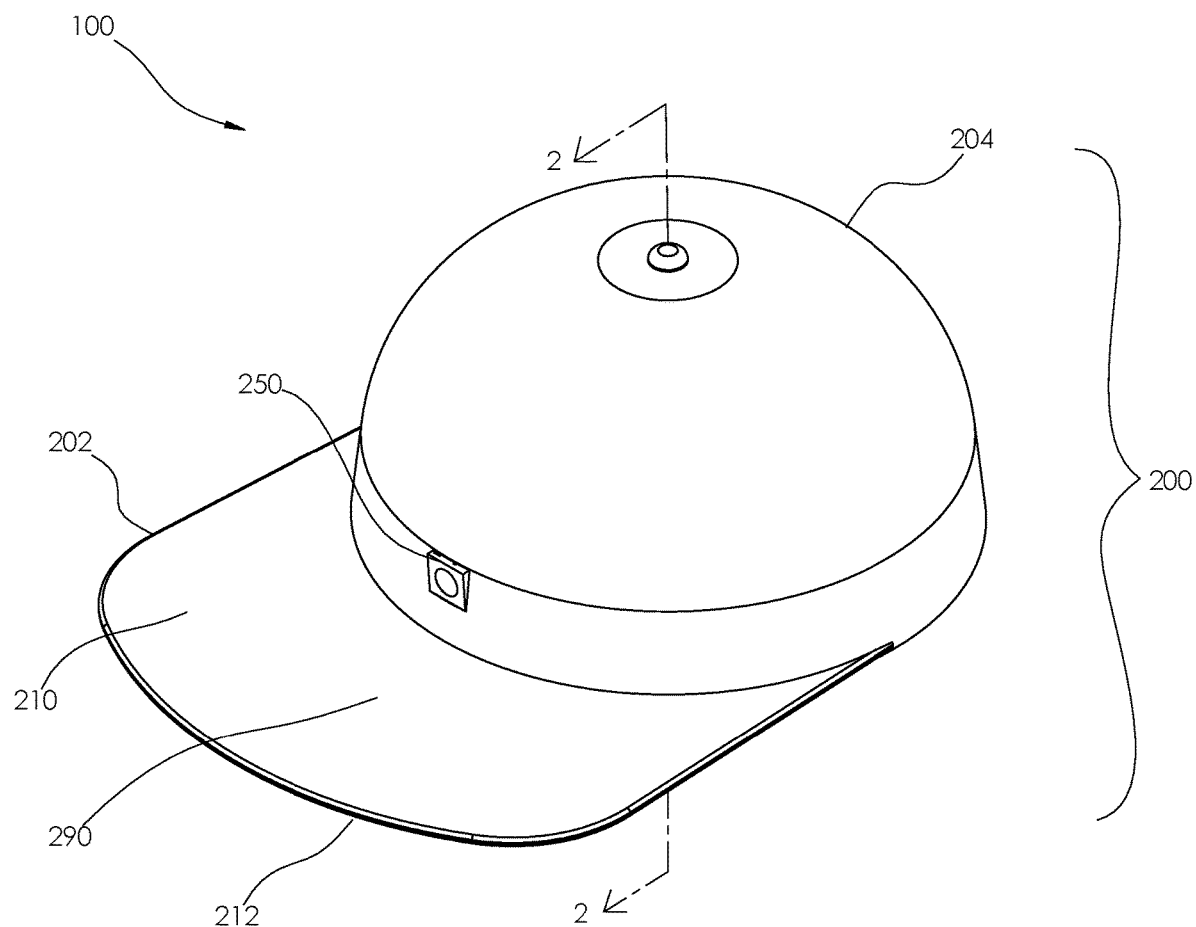
FIG. 1 is an isometric view of an embodiment of the disclosure.
Figure 2:
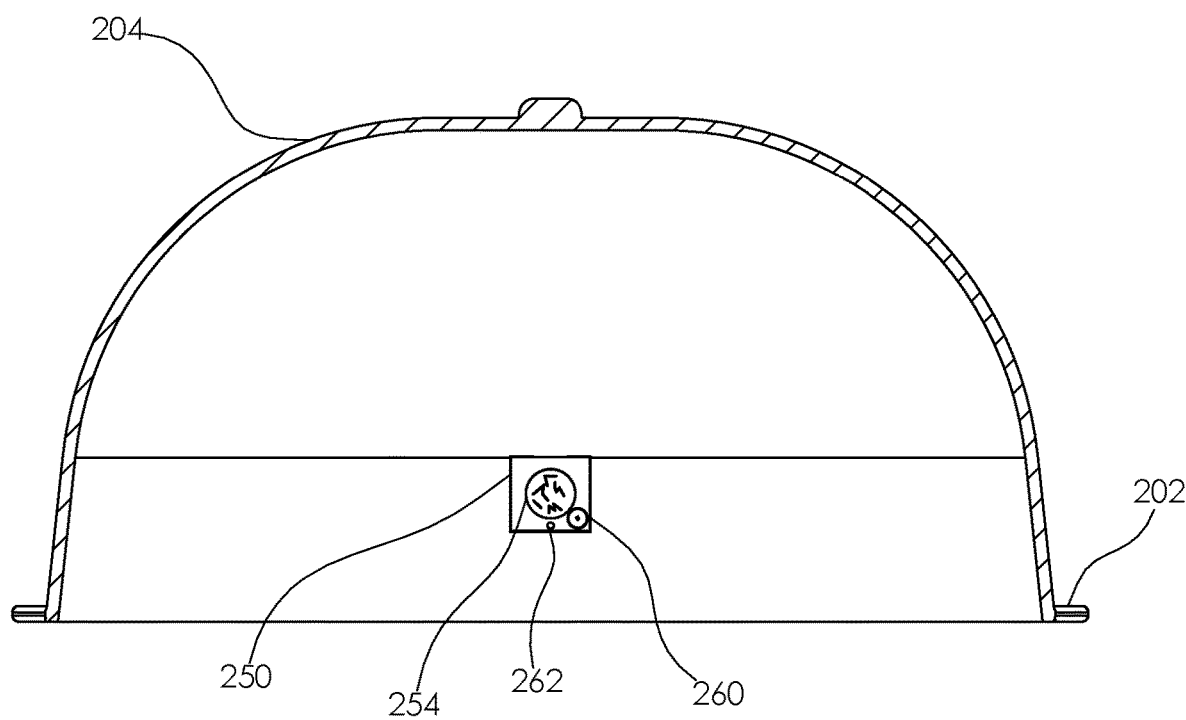
FIG. 2 is a cross-sectional view of an embodiment of the disclosure across 2-2 as shown in FIG. 1.
Figure 3A:
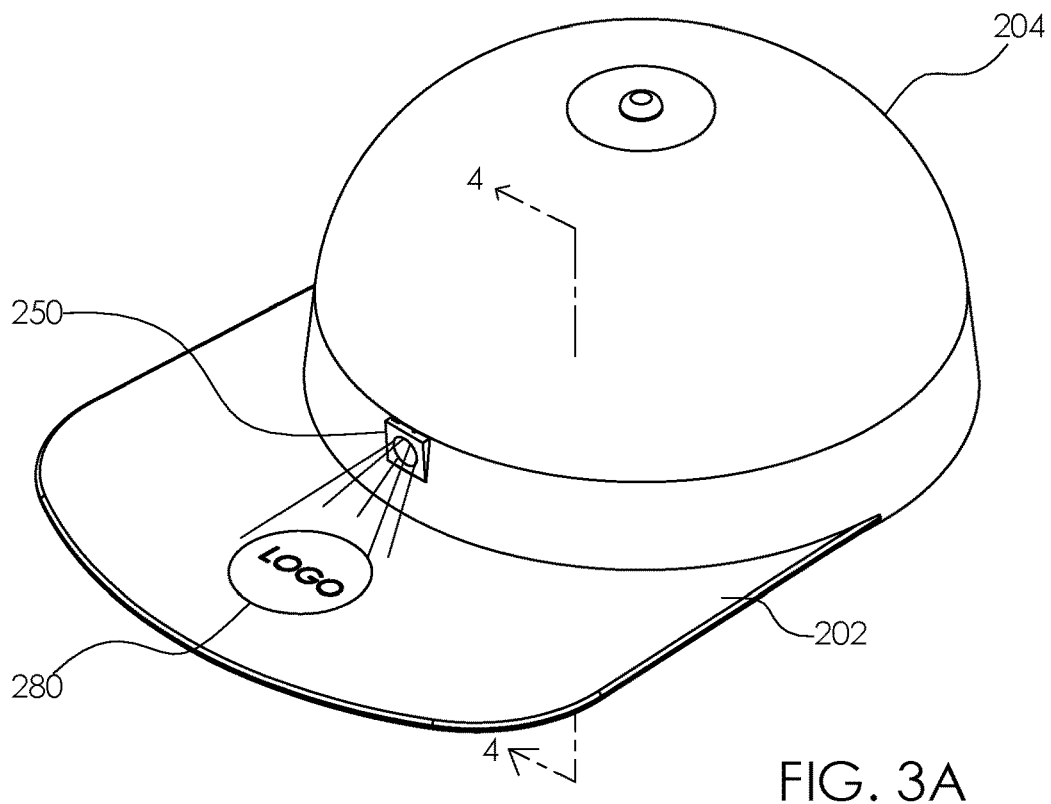
FIG. 3A is a front view of an embodiment of the disclosure illustrating the image projector coupled to a baseball cap.
Figure 3B:
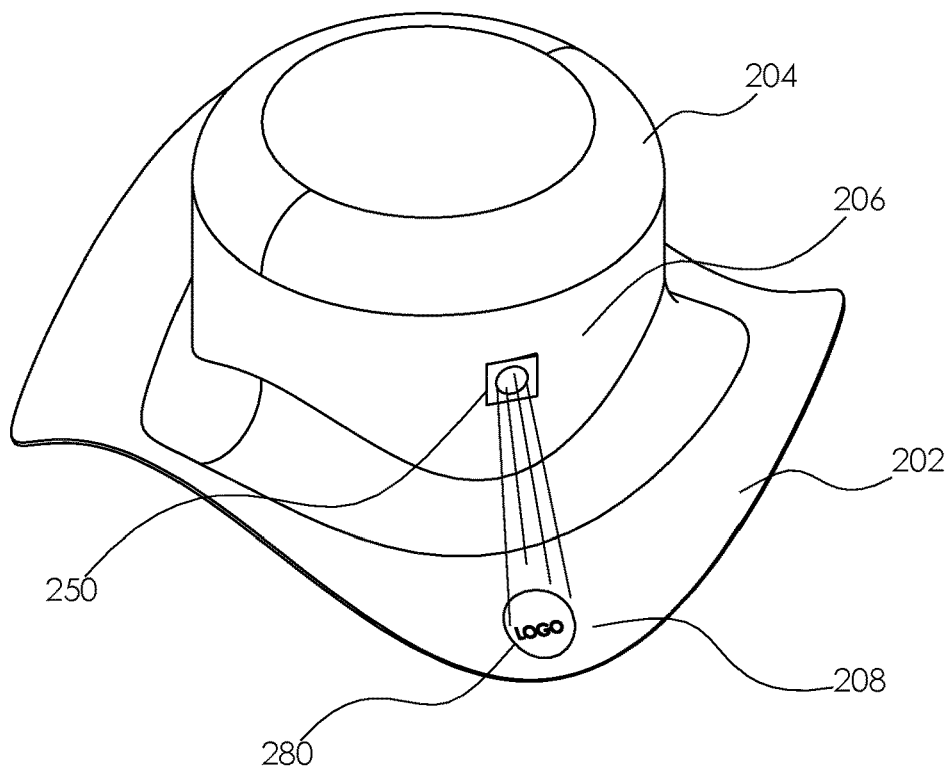
FIG. 3B is a front view of an embodiment of the disclosure illustrating the image projector coupled to a woman's hat.
Figure 4:
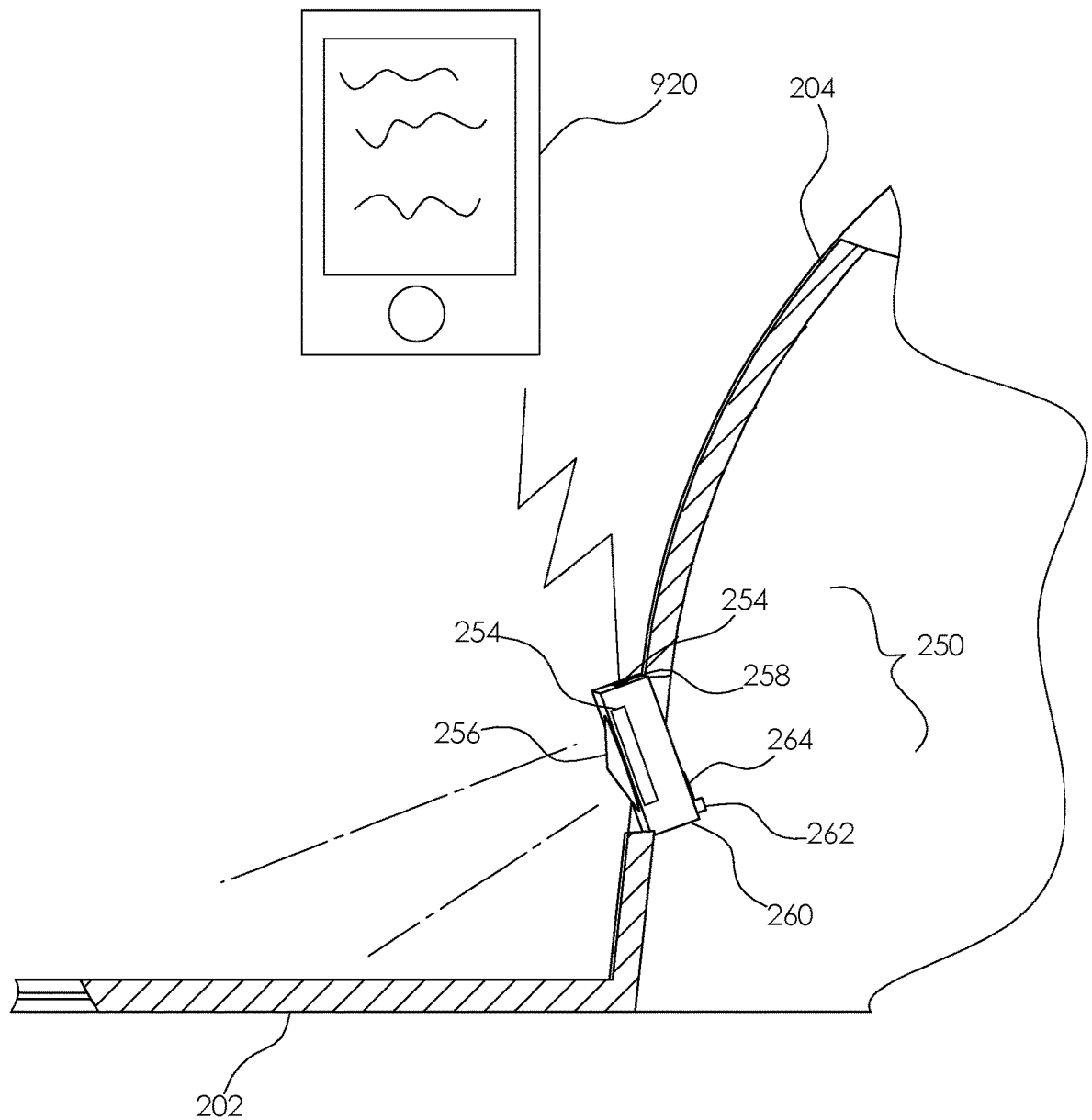
FIG. 4 is a cross-sectional view of an embodiment of the disclosure across 4-4 as shown in FIG. 3A.

Detailed reference will now be made to a first potential embodiment of the disclosure, which is illustrated in FIGS. 1 through 4.

The headwear with integrated image projector 100 (hereinafter invention) comprises an image projector 250 and a hat 200. The hat 200 may be adapted to be worn upon a head of a wearer. The image projector 250 may be coupled to the hat 200. The hat 200 may project a projected image 280 from the hat 200 onto a viewing surface 290 using the image projector 250.

The image projector 250 may project a rendering as the projected image 280. The image projector 250 may comprise an optical lens 256 to focus the output of the image projector 250 onto the viewing surface 290. As non-limiting examples, the projected image 280 may be textual, graphical, or a combination thereof. As a non-limiting example, the projected image 280 may be a logo. The logo may represent a team, corporation, or other organization. In some embodiments, the rendering may be transparent and the image projector 250 may project the projected image 280 by passing illumination from a light source 252 through the rendering. In some embodiments, the image projector 250 may project the projected image 280 by creating the rendering using an array of active picture elements 254.

In some embodiments, the projected image 280 may be dynamic such that the projected image 280 appears to change over time. As a non-limiting example, the projected image 280 may be a sequence of pictures that are each presented for a time interval. The invention 100 may thereby display multiple, independent logos, messages, graphics, or combinations thereof.

In some embodiments, the projected image 280 may be a sequence of related pictures presented at a frame rate of at least 15 frames per second such that the projected image 280 appears to show continuous motion.

In some embodiments, the image projector 250 may project an inverted or pre-distorted image to ensure that the projected image 280 projects accurately onto the viewing surface 290 if the viewing surface 290 is known to be sloping or curved.

In some embodiments, the image projector 250 may comprise the light source 252 that is internal to the image projector 250. In some embodiments, the light source 252 may be one or more Light Emitting Diodes (LEDs).

The hat 200 may comprise a hat bowl 204 and a hat brim 202. The hat bowl 204 may be adapted to cover the top of the head of the wearer. The hat brim 202 may be a protrusion of the hat 200 in a direction that is angled from the hat bowl 204. The hat brim 202 may be flat or curved. The hat brim 202 may surround the hat bowl 204, either partially or entirely. Hats with firm or semi-ridged brims may be particularly suited to holding a lens, as flexible brims may result in an unpredictable lens placement. In a preferred embodiment, the hat 200 may be a baseball cap having a substantially ridged brim. However, the hat 200 is not limited to baseball caps. As non-limiting examples, the hat 200 may be a tribly, fedora, Panama hat, western/cowboy hat, or bush hat. The hat brim 202 may define a top surface 210 and a bottom surface 212.

In some embodiments, the image projector 250 may be coupled to a first position 206 of the hat 200 and the viewing surface 290 may be a second position 208 of the hat 200. As a non-limiting example, the first position 206 may be the front of the hat bowl 204 and the second position 208 may be the top surface 210 of the hat brim 202.

The image projector 250 may be powered from a power source 260. As a non-limiting example, the power source 260 may be a battery. The power source 260 may comprise one or more energy-storage devices. The power source 260 may be a source of electrical energy to operate the image projector 250 and the light source 252. The power source 260 may be replaceable or rechargeable.

The image projector 250 may comprise a light toggle 262 to turn the light source 252 on and off. The light toggle 262 may be a button, a switch, a motion detector, a pressure sensor, a control, or combinations thereof.

The image projector 250 comprise an image toggle 264 to toggle the image projector 250 between images selected from a set of images. As a non-limiting example, the image toggle 264 may toggle the image projector 250 to change the projected image 280 from a first image to a second image. If provided, the image toggle 264 may be a button, a switch, a motion detector, a pressure sensor, a control, or combinations thereof. In some embodiments, the image toggle 264 may be operable to choose which specific image of the set of images is to be projected. As a non-limiting example, activating the image toggle 264 three times may select a third image while activating the image toggle 264 two times may select the second image.

In some embodiments, the hat 200 having the image projector 250 may comprise a wireless communication interface 258 such that the image projector 250 may communicate with an application program 295 running on a wearer's smartphone 920. As a non-limiting example, the wireless communication interface 258 may be a transceiver. In such embodiments, status information regarding the image projector 250 may be sent from the image projector 250 to the application program 295 running on the wearer's smartphone 920 and commands may be sent from the application program 295 to the image projector 250. In some embodiments, the light toggle 262 and the image toggle 264 may not by physically present on the image projector 250 because the wearer's smartphone 920 may be operable to remotely activate functions controlled by the light toggle 262 and the image toggle 264. As a non-limiting example, the wearer may remotely control the on/off state of the light source 252 and select the projected image 280 from the set of images by sending one or more commands from the wearer's smartphone 920.

In some embodiments, the power source 260 for the image projector 250 may be a thermal power source. The thermal power source may be adapted to generate power from the heat given off by the head of the wearer. In some embodiments, the power source 260 may generate power from rhythmic motion of the invention 100, such as motion derived from footfalls, movements of the head, or other movements of the wearer.

It is to be understood that other embodiments of the invention 100 exist besides those that are explicitly disclosed herein. As non-limiting examples, more than one of the image projectors 250 may be used, different types and styles of hats may be selected, and different placements of the image projector 250 and the viewing surface 290 on the hat 200 are possible.

In use, the wearer may power the image projector 250 by activating the light toggle 262 or by interacting with the application program 295 running on the wearer's smartphone 920. The wearer may place the hat 200 of their head. The image projector 250 may project the projected image 280 onto the viewing surface 290 when the projected image 280 may be viewed by other individuals. In some embodiments, the wearer may select other images by activating the image toggle 264 or by interacting with the application program 295 running on the wearer's smartphone 920.

With respect to the above description, it is to be realized that the optimum dimensional relationship for the various components of the invention described above and in FIGS. 1 through 4, include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. A headwear with integrated image projector comprising:
   an image projector and a hat;
   wherein the hat is adapted to be worn upon a head of a wearer;
   wherein the image projector is coupled to the hat;
   wherein the hat projects a projected image from the hat onto a viewing surface using the image projector;
   wherein the image projector is powered from a power source;
   wherein the hat having the image projector comprises a wireless communication interface such that the image projector communicates with an application program running on a wearer's smartphone;
   wherein status information regarding the image projector is sent from the image projector to the application program running on the wearer's smartphone and commands are sent from the application program to the image projector.

2. The headwear with integrated image projector according to claim 1
   wherein the image projector projects a rendering as the projected image;
   wherein the image projector comprises an optical lens to focus the output of the image projector onto the viewing surface.

3. The headwear with integrated image projector according to claim 2
   wherein the projected image is a logo.

4. The headwear with integrated image projector according to claim 2
   wherein the projected image is dynamic such that the projected image appears to change over time.

5. The headwear with integrated image projector according to claim 4
   wherein the projected image is a sequence of related pictures presented at a frame rate of at least 15 frames per second such that the projected image appears to show continuous motion.

6. The headwear with integrated image projector according to claim 2
   wherein the image projector projects an inverted or pre-distorted image to ensure that the projected image projects accurately onto the viewing surface if the viewing surface is known to be sloping or curved.

7. The headwear with integrated image projector according to claim 2
   wherein the image projector comprises a light source that is internal to the image projector.

8. The headwear with integrated image projector according to claim 7
   wherein the hat comprises a hat bowl and a hat brim;
   wherein the hat bowl is adapted to cover the top of the head of the wearer.

9. The headwear with integrated image projector according to claim 8
   wherein the hat brim is a protrusion of the hat in a direction that is angled from the hat bowl;
   wherein the hat brim defines a top surface and a bottom surface.

10. The headwear with integrated image projector according to claim 9
    wherein the image projector is coupled to a first position of the hat and the viewing surface is a second position of the hat.

11. The headwear with integrated image projector according to claim 10
    wherein the first position is the front of the hat bowl and the second position is the top surface of the hat brim.

12. The headwear with integrated image projector according to claim 10
    wherein the power source is a battery;
    wherein the power source comprises one or more energy-storage devices;
    wherein the power source is a source of electrical energy to operate the image projector and the light source;
    wherein the power source is replaceable or rechargeable.

13. The headwear with integrated image projector according to claim 10
    wherein the image projector comprises a light toggle to turn the light source on and off.

14. The headwear with integrated image projector according to claim 13
    wherein the image projector comprises an image toggle to toggle the image projector between images selected from a set of images.

15. The headwear with integrated image projector according to claim 10
    wherein the wireless communication interface is a transceiver.

16. The headwear with integrated image projector according to claim 10
    wherein the power source for the image projector is a thermal power source;
    wherein the thermal power source is adapted to generate power from the heat given off by the head of the wearer.

* * * * *